Patented Aug. 9, 1932

1,871,036

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF TREATING RUBBER AND PRODUCTS OBTAINED THEREBY

No Drawing. Application filed March 2, 1928. Serial No. 258,670.

This invention relates to the treatment of rubber and similar materials and to the products obtained thereby. The invention is more particularly concerned with new classes of chemical compounds capable of functioning as accelerators of vulcanization. This application is a continuation-in-part of application Serial No. 174,710, filed March 11, 1927.

Accordingly the objects of the invention include the vulcanization of rubber treated with the hereinafter described classes of compounds. Another object is to provide new chemical compounds, particularly useful in vulcanization, which are comparatively inexpensive and at the same time highly efficient both from the standpoint of their behavior during the compounding of rubber as well as in the properties which they impart to the vulcanized product. Another object of the invention is to accelerate the action of the new chemical compounds by the addition of base or to retard their action by the addition of acid material. A further object of the invention is to provide a method whereby the acid or base or the new compounds themselves may be introduced into rubber.

In the present practice of the use of accelerators, it is generally known that many of the compounds employed are so powerful that the cause a prevulcanization, or burning on the mixing mill. This serious disadvantage is possessed by many of the accelerators which have the property of vulcanizing rubber at ordinary temperatures or at temperatures well below those ordinarily employed in hot vulcanization, for example at 212° F. or thereabouts. Illustrations of such rapid accelerators are metallic dithiocarbamates, metallic salts of other thio acids, mercapto thiazoles and the like. According to the present invention this serious objection of prevulcanization may be entirely overcome, the rubber compounds may be mixed upon the mill with practically no danger of prevulcanization thereon, without sacrificing the accelerating power which is desired. Certain of the compounds forming the subject matter of the present invention may be mixed with rubber with entire safety on the mixing mills, subject to the conditions hereinafter named, whereas others may be safely mixed, observing certain precautions as to mill temperature, etc.

The invention includes combining rubber and similar vulcanizable materials with a vulcanizing combination, including a vulcanizing agent, a metallic oxide or its equivalent, and a substance containing the radical

and vulcanizing the rubber. The invention also includes the products thus obtained. In

R represents any element, preferably nitrogen, oxygen, carbon, or sulphur; X represents any bivalent element such as sulphur or oxygen, or a trivalent element as in the case of a thiazole; R and X may or may not be parts of a ring. Y is a carbon atom attached at the S of the

radical, and is not doubly bonded to sulphur or oxygen, Y is further a carbon atom in a substituted aryl group comprising more than C and H, or an aliphatic carbon atom which is further linked to at least two substituents other than H, the substituents being such that the whole compound which comprises the group

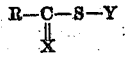

will react at the thiol sulphur-carbon bond, i. e., at S—Y, with sodium hydroxide in boiling aqueous alcohol at least as rapidly as diphenylmethyl dimethyl dithiocarbamate reacts under the same conditions. The invention also includes the preparation of the new chemicals herein described.

The invention further consists in accelerating the action of the compounds by the addition of basic materials and in retarding the action of the accelerating compounds and particularly the burning of the rubber compounds by the addition of acid materials. The invention further consists in introducing basic materials or acid materials or the compounds herein disclosed by diffusion from rubber or from any surrounding medium.

It will be seen from the list of compounds given below that in the dithiocarbamates R is nitrogen, in the xanthogenates R is oxygen, in the dithiobenzoates R is carbon, and in the mercapto thiazoles R is sulphur; X is sulphur in the dithiocarbamates, xanthogenates, and dithiobenzoates, and is nitrogen in the mercapto thiazoles. The mercapto thiazoles also afford an example in which the R and X are parts of a ring. The characteristic groups of these new compounds may be conveniently illustrated as follows:

Y = a carbon atom in a substituted cyclic group

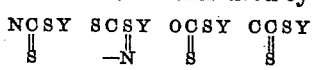

Y = a carbon atom in a substituted methyl group

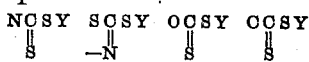

As illustrations of groups comprising X, in which X is a carbon atom in a substituted cyclic group, the following may be given:

2-4 dinitrophenyl
2-6 dinitro 4 chloro phenyl
2-4-6 trinitro phenyl (picryl) etc.

As illustrations in which Y is the methyl carbon atom in a substituted methyl group, the following may be given:

Diphenyl methyl
Triphenyl methyl
Phenyl methylene (benzal)
Trimethyl methyl (tertiary butyl)
Phenyl chlor methylene
Phthalimidomethyl
Diiodomethyl
Allyl etc.

The substituted groups are hereinafter designated as Q, and the thiol S as $\overset{\alpha}{S}$. Where $\overset{\alpha}{S}$— prefixes a word it is to be understood that the structure represented by the word is directly connected to the $\overset{\alpha}{S}$.— in the examples of poly nitro phenyl groups it will be observed that there is at least one nitro group ortho to the 1-position, and that at least one of the remaining substituents is meta to the aforesaid nitro group. In the dinitro phenyl groups, the two nitro groups are meta to each other, and at least one of them is ortho to the 1-position.

All of the compounds disclosed herein may be prepared according to the same general procedure, namely treating a solution of a salt (preferably the sodium salt) of the thiol acid, thiazole, xanthogenate, dithiobenzoate etc. with a solution of the chloride of the substituted group comprising Y. For example a solution of sodium dimethyl dithiocarbamate may be treated with a solution of 2-4 dinitro chlor benzol or of benzal chloride.

The whole compound such as 2-4 dinitro phenyl dimethyl dithiocarbamate reacts at least as rapidly with sodium hydroxide in boiling aqueous alcohol as diphenylmethyl dimethyl dithiocarbamate reacts under the same conditions. All the compounds which react with sodium hydroxide at least as rapidly as diphenylmethyl dimethyl dithiocarbamate, accelerate vulcanization, in the presence of a metallic oxide, such as zinc oxide or an equivalent metallic compound.

Zinc oxide is a good illustration of a metallic oxide which may be used. In place of zinc the following elements may be used in combined form, preferably somewhat basic and soluble in rubber; mercury preferably in the mercuric state, lead preferably in the plumbous state, cadmium, copper preferably in the cupric state, arsenic preferably in the arsenous state, manganese preferably in the manganous state. Preferably the metallic compound is of such a nature that the metallic element is available during the vulcanization process. Oxides, stearates, carbonates are among the metallic compounds which may be used.

As one illustration of the invention employing the 2, 4 dinitrophenyl dimethyl dithiocarbamate, the following is given: 100 parts of Pale Crepe, 10 parts of zinc oxide, 3 parts of sulphur, and 0.25 part of the 2, 4 dinitrophenyldimethyldithiocarbamate may be mixed together in the customary way on the mixing rolls or in any other desired way. The rubber stock thus prepared is well vulcanized in 30 minutes at 40 pounds steam pressure. With .25 part of the carbamate a well cured stock may be obtained in 30 minutes at 30 pounds steam pressure or in 60 minutes at 20 pounds. Good results may be obtained at temperatures corresponding to steam pressures varying from 10 pounds to 40 pounds or above, by making proper adjustment in the quantity of accelerator employed. The above mentioned compound is particularly well suited for use in highly compounded stocks, will give non-blooming products with a short cure, or at the lower temperature of the hot vulcanizing range. This carbamate may be used to advantage in shoe upper stocks, since it functions well in air cures. It works well with reclaimed rubbers and low grade rubbers. If this stock be prepared on a mixing mill it will be found that the tendency towards prevulcanization on the mill is less than would be observed with the corresponding thiuram monosulphide prepared from a dimethyl dithiocarbamate.

The 2-4 dinitrophenyldimethyldithiocarbamate may be prepared as follows:

196 pounds of 23% dimethylamine solution (or an equivalent amount of approximately the same strength) is treated with 80 pounds of carbon disulphide in a closed system provided with a means of cooling the reaction mixture. 160 pounds of 25% sodium hydroxide is added using the same closed system and cooling. Good agitation is desirable for these operations. The solution is filtered from the excess carbon disulphide or other extraneous matter and constitutes an aqueous solution of sodium dimethyl dithiocarbamate. 202 pounds of 2,4 dinitro chlor benzol is dissolved by adding 1188 pounds of denatured alcohol (82% by weight) at about 104° F. The solution of the sodium salt of dimethyl dithiocarbamate is run into the alcoholic solution of dinitrochlor benzol in the course of about 45 minutes. During the addition the temperature of the reaction mixture should be maintained at about 104° F. and the mixture should be well agitated. The stirring is continued for about an hour at this same temperature. The mixture is then cooled to room temperature and filtered. The residue is washed with water and dried at 150° F. The material should melt at 135 to 140° C. Upon purification by recrystallization from alcohol, a melting point of 142° C. (uncorrected) is obtained. The compound is believed to have the formula

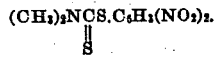

It is a yellow compound which crystallizes in needles, insoluble in water, soluble in hot alcohol, slightly soluble in cold alcohol, readily soluble in both benzol and acetone. If recrystallized from acetone or benzol the melting point rises to 151–152° C. The compound may be obtained from the above method in yields of 95% or greater. Upon analysis it gives the following figures for sulphur and nitrogen:

|  | Found | Calculated |
|---|---|---|
| Sulphur | 21.8 | 22.3 |
| Nitrogen | 13.3 | 14.6 |

As another embodiment one may mix 100 parts of Pale Crepe, 10 parts of zinc oxide, 3 parts of sulphur and 1½ parts of 2,4 dinitrophenyl benzothiazylsulphide. This stock resists burning on the mill and is well vulcanized after heating for 60 minutes under 20 pounds steam pressure or for 60 minutes under 40 pounds steam pressure. This stock does not deteriorate as rapidly as similar stocks employing other accelerators such as the dimethyl dithiocarbamate compounds referred to above for instance. The 2-4 dinitrophenyl benzothiazyl sulphide works well in air cures and with litharge.

The 2-4 dinithrophenyl benzothiazylsulphide may be prepared as follows:

40 grams of sodium hydroxide are dissolved in 500 grams of water and 168 grams of mercapto benzothiazole and 500 cc. of 95% alcohol are added. The mixture is heated to 50–60° C. until all the mercapto benzothiazole has dissolved. 202½ grams of dinitrochlorbenzol are then added and the mixture heated under a reflux condenser until the dinitrochlorbenzol has disappeared. The mixture is then cooled and the 2-4 dinitrophenyl benzothiazylsulphide which precipitates out is removed by filtration, washed free of sodium chloride, dried and ground. The melting points should be 156–157° C. On further purification the melting point is 162½° C. The body is insoluble in water, practically insoluble in cold alcohol, fairly soluble in hot alcohol and cold benzol, and soluble in warm benzol, and also soluble in cold acetone. Its alcoholic solution hydrolyzes in the presence of alkali. The probable formula is:

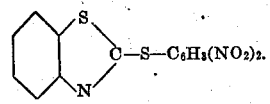

As another embodiment one may mix 100 parts of Pale Crepe, 10 parts zinc oxide, 3 parts sulphur, and .2 part of phenyl methylene bis-dimethyl dithiocarbamate on the mills in the usual manner. The stock resists burning on the mill and may be vulcanized in a mold for 60 minutes under 40 pounds steam pressure or at 20 pounds steam pressure. This compound does not impart any coloration to the rubber stock. It may be used to advantage in air cures.

Phenyl methylene bis dimethyl dithiocarbamate (benzal bis dimethyl dithiocarbamate) is a new compound. One method of preparing it is as follows:

Two volumes of alcohol are added to an approximately 33% solution of sodium dimethyl dithiocarbamate and to this mixture are then added 80.5 grams of benzal chloride. The mixture is heated to 60–70° for about two hours. It is then cooled, let stand for about 2 hours for complete crystallization and filter. The product is washed with a little alcohol, diluted with two volumes of water and further washed with water. It is then dried. The melting point is 181 to 183°.

As another example, 100 parts of Pale Crepe, 10 parts of zinc oxide, 3 parts of sulphur and .4 part of triphenylmethyl diethyl dithiocarbamate may be mixed together on the mills in the usual manner. The stock may be vulcanized in a mold for 60 minutes under 40 pounds steam pressure.

As another embodiment one may mix 100 parts of Pale Crepe, 10 parts of zinc oxide, 3 parts of sulphur and .4 part of 2-4 dinitrophenyl di-isopropyl dithiocarbamate on the mill in the usual manner. This stock may be vulcanized for 60 minutes under 40 pounds steam pressure.

As an example of a stock which may be vulcanized in air according to the usual method employed in the vulcanization of black footwear, one may mix 40 parts of Pale Crepe, 5 parts of iron oxide, .81 part of sulphur, 25 parts of lamp black, 3 parts of carbon black, 4 parts of zinc oxide and 22 parts of barytes with .5 part of 2,4 dinitrophenyl dimethyl dithiocarbamate. This stock vulcanized well in the ordinary air cure.

The compounds disclosed herein function well when the cure is carried out according to any of the commercial methods such as in steam, talc, water, etc.

I have observed that the action of the compounds disclosed herein is accelerated by the presence of a small amount of a basic material such as sodium hydroxide, trisodium phosphate, dicyandiamide, piperidine, aniline, dibenzylamine, piperazine hydrate, triethanolamine. The action of the basic substances is particularly marked in the case of the polynitrophenyl compounds such as 2,4 dinitrophenyl dimethyl dithiocarbamate and 2,4 dinitrophenyl benzothiazyl sulphide. The use of the base lowers the temperature at which the accelerator functions or increases its speed of functioning and usually increases the tensile strength at all temperatures of vulcanization by about 10%. For instance a stock made up of 100 parts of Pale Crepe, 10 parts of zinc oxide, 3 parts of sulphur and .25 part of 2,4 dinitrophenyl dimethyl dithiocarbamate gave in one instance a tensile of 1235 pounds per square inch after 60 minutes at 5 pounds steam pressure and 2980 pounds after 60 minutes at 40 pounds steam pressure. In one instance .07 part of sodium hydroxide was added and the tensile after 60 minutes at 5 pounds steam pressure was 3465 pounds and after 60 minutes at 40 pounds steam pressure the tensile was 3365 pounds. When one part of sodium hydroxide was added to the stock it cured at ordinary temperatures in less than a week and gave a tensile of 4935 pounds after 60 minutes at 5 pounds steam pressure. .15 part of piperidine was added instead of the sodium hydroxide and the stock gave a tensile of 4740 pounds after 60 minutes at 10 pounds steam pressure, 5550 pounds after 60 minutes at 20 pounds steam pressure and 4300 pounds after 60 minutes at 40 pounds steam pressure.

The effect of the base on these dinitrophenyl compounds is much more marked than it is upon other accelerators such as tetramethylthiuram monosulphide, diphenylguanidine, acetaldehyde aniline condensation product or heptaldehyde aniline condensation product.

Since a basic substance accelerates the action of the accelerator and lowers the temperature at which it functions, it also increases the speed of burning on the mixing mill. Therefore the greater the amount of base present in the mix, the greater the danger of burning on the mixing mill and rubbers which are basic therefore accelerate the action of these compounds. Burning on the mixing mill is one form of what is herein called premature vulcanization. The latter expression also includes the burning, scorching, or setting up of the stock on mills, calenders, tubing machines, as well as any prevulcanization which may occur or be incipient prior to the actual deliberate vulcanization operation. This is particularly true of the polynitrophenyl compounds.

On the other hand the addition of acid retards the action of the accelerator and therefore improves its resistance to burning. Here again the action is particularly marked in the case of the polynitrophenyl compounds. For instance .1 part of monochlor acetic acid added to the stock given above so affects the action of the accelerator that after 60 minutes at 5 pounds steam pressure, no cure was obtained and after 60 minutes at 40 pounds steam pressure the tensile was 2380 pounds. If .5 part of monochlor acetic acid were used no cure was obtained even after 60 minutes at 40 pounds steam pressure. Other acids which I have successfully employed are sulphanilic, oxalic, picric, phosphoric, trichloracetic, para toluene sulphonyl chloride and pine tar. I have also successfully employed substances which may form acids during the course of vulcanization such as ethyl oxalate or zinc acetate.

Since the presence of acid retards the action of compounds disclosed herein and particularly the action of the polynitrophenyl compounds, the addition of an appropriate amount of acid serves to increase the resistance to burning as much as may be desired. Mixes which are slightly acid because of the presence of carbon black or pine tar resist burning on the mill abnormally well. The vulcanization of rubbers or rubber stocks which are acid by nature, or contain appreciable amounts of acid or acidic ingredients is not accelerated so well by the herein described compounds, unless the acidic properties be first removed or neutralized.

Likewise, rubbers or rubber stocks which are appreciably basic by nature, or contain basic materials may display a marked often undesirable tendency towards prevulcanization. Such basic rubbers or stocks may be treated with acidic material to remove or curb or control this tendency to prevulcanize. Therefore, the use of basic material and acidic material in suitable proportions as required, any rubber or stock may be brought to a predetermined speed of vulcanization.

Instead of adding on the mixing roll the basic materials intended to activate the compounds, or accelerate their action, one may permit the basic material to diffuse into the rubber. For instance if the stock given above for vulcanization in the air be vulcanized in air containing ammonia, the vulcanization is greatly accelerated and the surface of the stock is remarkably hard and resistant to marring. The introduction of the basic material may be made on the mill, by diffusion from a liquid, solution, or gas, or from adjoining rubber stock or from a fabric.

As another example, I make the compounds in the usual manner consisting of 100 parts of Pale Crepe, 10 parts of zinc oxide, 3 parts of sulphur and 2 parts of 2-4 dinitrophenyl dimethyl dithiocarbamate. This stock in the form of a sheet .060" thick or in the form of an article may be treated with gaseous ammonia for 16 hours. Thereafter it will vulcanize at 212° F. much more rapidly than a stock not so treated. Instead of gaseous ammonia, I may employ aqueous ammonia, aqueous diethylamine, aqueous aniline or dimethylamine or aniline vapor. It is believed that these basic materials diffuse into the rubber and accelerate the action of the dinitrophenyl dimethyl dithiocarbamate.

Similar results have been obtained with 2,4 dinitrophenyl benzothiazyl sulphide. The action of the bases and acids is most marked with the polynitrophenyl compounds but the bases and acids also function with the other compounds disclosed herein such as triphenylmethyl diethyl dithiocarbamate for instance.

As an example of the introduction by diffusion of the basic material as well as the introduction by diffusion of some of the compounds disclosed herein, the following illustration is given. 100 parts of Pale Crepe, 10 parts of zinc oxide, 3 parts of sulphur, 1 part of 2,4 dinitrophenyl dimethyl dithiocarbamate and .2 part of monochlor acetic acid are mixed to form one stock which is calendered to a thickness of .010". Another stock is made up of 100 parts of Pale Crepe, 10 parts of zinc oxide, 3 parts of sulphur and 4 parts of dibenzylamine. This stock is mixed on the mills in the usual manner and calendered to a thickness of .010". The two stocks are plied up alternately using 3 plies of each and allowed to stand for 24 hours to permit the diffusion of the dibenzylamine into the dinitrophenyl stock and of the dinitrophenyl dimethyl dithiocarbamate into the dibenzylamine stock. Thereafter the plied up stock is heated at 212° F. and it is found that vulcanization occurs much more quickly than it does for the individual stocks which have not been plied up. It will be observed that the dibenzylamine acts to neutralize the monochlor acetic acid as well as to activate the dinitrophenyl dimethyl dithiocarbamate.

As pointed out before the presence of the monochlor-acetic acid improves the resistance to burning but the procedure may also be carried out without the use of the acid.

Other compounds disclosed herein may be substituted for the compounds given above.

The basic material (ammonia etc.) may be introduced from the surrounding medium such as air or water to neutralize the acid and/or to activate the accelerator. For instance if .2 part of acid be added to the stock given above, and the stock be for air cure cured in air containing ammonia gas the ammonia will not only neutralize the acid but will activate the dinitrophenyl compound. The basic material may be introduced in any desired manner at any time prior to complete vulcanization, i. e., it may be introduced during vulcanizations as a gas or vapor, or it may be applied to the stock by painting, dipping or blending in cement form etc. before the stock is subjected to vulcanization, or the stock may be vulcanized in a solution or suspension of the basic material.

Any of these ingredients, base, acid and accelerator may be brought together in the form of cements, i. e. a cement containing accelerator may be mixed with a cement containing the base, at the time the cement is to be used. The accelerator cement will not vulcanize appreciably at ordinary temperatures, if the base be absent. Likewise, an accelerator-containing cement may be preserved in an unvulcanized condition for a long period by the addition of acid (as such, in solution, or in a cement). When vulcanization is desired, a base may be added (as such, in solution, or in a cement) and vulcanization will then take place.

It is believed that the dinitrophenyl compounds are particularly susceptible to the action of acids and alkalies because the dinitrophenyl compounds of all sorts of acids such as dimethyl dithiocarbamic acid or hydrochloric acid do not hydrolyze readily in acid solution but do hydrolyze in the presence of an alkali or a base.

Other compounds which may be employed according to the processes disclosed are:

2,4 dinitrophenyl diethyl dithiocarbamate (M. P. 81° C.)

2,4 dinitrophenyl di-normal propyl dithiocarbamate (M. P. 84° C.)

2,4 dinitrophenyl di-isobutyl dithiocarbamate (M. P. 85° C.)

2,4 dinitrophenyl di-normal butyl dithiocarbamate 2,4 dinitrophenyl di-iso amyl dithiocarbamate (M. P. 52–54° C.)

2,4 dinitrophenyl dibenzyl dithiocarbamate (M. P. 106° C.)

2,4 dinitrophenyl morpholine dithiocarbamate (M. P. 125–130° C.)
 (2,4 dinitrophenyl oxy-di-ethylene dithiocarbamate)

2,4 dinitrophenyl dicyclohexyl dithiocarbamate (M. P. 127° C.)

2,6 dinitro-4-chlorophenyl diethyl dithiocarbamate (M. P. 123° C.)

2,4,6 trinitrophenyl diethyldithiocarbamate.

All of these compounds are insoluble in water, soluble in benzol, acetone, hot alcohol, and slightly soluble in cold alcohol.

The same procedure may be employed in making the above listed compounds and other dialkyl compounds as has been previously described for the preparation of 2-4 dinitrophenyl dimethyl dithiocarbamate.

The 2-6 dinitro-4-chlorophenyl derivatives of substituted dithiocarbamates may be similarly prepared. For example 2-6 dinitro-4-chlorophenyl dimethyl dithiocarbamate may be prepared as follows:

45 grams of dimethylamine are dissolved in 1000 cc. of alcohol and to this solution are added 76 grams of carbon disulphide. To this mixture are then added 40 grams of caustic soda dissolved in a small amount of water, the whole mixture being kept cool throughout. The result is an alcoholic solution of sodium dimethyl dithiocarbamate. To this mixture are then added 237 grams of 2-6 dinitro 1,4 dichlorobenzol and the whole heated to 50-60° C. for ¾ of an hour. The reaction mixture is then cooled and the product which is the 2-6 dinitro 4 chlorophenyl dimethyl dithiocarbamate crystallizes out. It is filtered from the alcohol, washed free from sodium chloride and dried.

2-6 dinitro-4-chlorophenyl dimethyl dithiocarbamate has a melting point after crystallization from alcohol of 123° C. (uncorrected). The compound is soluble in benzol, acetone, and hot alcohol, but is only slightly soluble in cold alcohol and insoluble in water.

Likewise, the 2-4-6 trinitrophenyl thiol derivatives of substituted dithiocarbamates may be prepared, and these are new compounds. This particular class of compounds may be also called the picryl derivatives.

It will be noted that in these compounds, the nitrogen atom holds at least one aliphatic or alkyl group and is preferably disubstituted. These compounds may also be regarded as thiol esters, the ester group being attached to thiol sulphur. They are illustrative of compounds containing $$\overset{RCSY}{\underset{X}{\|}}$$

in which R is nitrogen and X is sulphur.

Further examples include organic derivatives of thiazoles:—

2,4 dinitrophenyl benzothiazyl sulphide (M. P. 167° C.)
Picryl benzothiazyl sulphide (M. P. 152° C.)
2,6 dinitro 4 chlorophenyl benzothiazyl sulphide (M. P. 167° C.)
Allylbenzothiazyl sulphide (B. P. 145-148° C.)
Diphenylmethylbenzothioazyl sulphide (M. P. 180° C.)

The last mentioned compounds illustrate compounds in which R and X of the group $$\overset{RCSY}{\underset{X}{\|}}$$

are joined, and R=S; X=N.

In this instance the general group may be written $$\overset{RCSY,}{\underset{X}{\|}}$$

and R and X are parts of a ring. They contain the group $$\overset{-SCSY}{\underset{-N}{\|}}$$

or

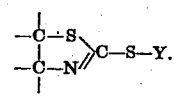

Other derivatives may also be used.

2,4,6 trinitrophenyl benzothiazyl sulphide may be prepared as follows:

168 grams of mercapto benzothiazole are dissolved in 500 cc of alcohol and 500 cc of water by means of 40 grams of sodium hydroxide. The solution then contains the sodium salt of mercapto benzothiazole. To this solution are added 247½ grams of 1 chloro 2,4,6 trinitrobenzene. The reaction mixture is then heated until the 1 chloro 2,4,6 trinitrobenzene has disappeared which will take about 3 hours. The reaction mixture is then cooled to room temperature whereupon the product, which is the 2,4,6 trinitrophenyl benzothiazyl sulphide crystallizes out. This is filtered from the reaction liquor, washed free from sodium chloride, and dried. It is a brick-red crystalline material melting after re-crystallization from alcohol at 152° C. uncorrected. It is soluble in benzol, insoluble in cold alcohol and only fairly soluble in hot alcohol. It is insoluble in water. The formula of this compound is believed to be

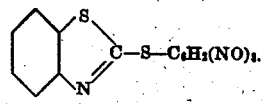

Another example of this class of compounds is 2,6 dinitro 4 chlorophenyl benzothiazyl sulphide which may be prepared as follows:

168 grams of mercapto benzothiazole are dissolved in 500 cc of alcohol and 500 cc of water by means of the addition of 40 grams of sodium hydroxide. The solution then contains the sodium salt of mercapto benzothiazole. To this solution are added 237 grams of 2,6 dinitro 1,4 dichlorobenzol and the whole heated to 60-70° until all of the 2,6 dinitro 1,4 dichlorobenzol has disappeared. The reaction mixture is then cooled to room temperature whereupon the product which is the 2,6 dinitro 4 chlorophenyl benzothiazyl-sulphide crystallizes out. This is filtered from the reaction mixture, washed free of sodium chloride and dried. This is a yellow body, soluble in benzol, quite soluble in hot alcohol and fairly soluble in cold alcohol. The melting point is 167° C. uncorrected. The formula is

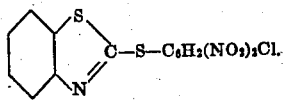

The allyl, diphenyl methyl, phenyl methylene and other derivatives or mercapto benzo thiazole may be similarly prepared.

As further illustrations the following may be given:

Phenyl chlor methylene bis diethyl dithiocarbamate (M. P. 176–177° C.)
Phenyl chlor methylene bis dimethyl dithiocarbamate (M. P. 111° C.)
Phenyl methylene bis benzo thiazyl sulphide (M. P. 114° C.)
Phenyl methylene bis diethyl dithiocarbamate (M. P. 110° C.)
Phenyl methylene bis dimethyl dithiocarbamate (M. P. 180–182° C.)

Other compounds are triphenylmethyl diethyl dithiocarbamate (M. P. 150–155° C), diphenylmethyl diethyl dithiocarbamate (M. P. 85° C), triphenylmethyl di-isoamyl dithiocarbamate (M. P. 89–90° C), triphenyl methyl di-normal-propyl dithiocarbamate (M. P. 66–67° C), diphenylmethyl dimethyl dithiocarbamate (M. P. 96.5–97° C), diphenyl methyl diethyl dithiocarbamate (M. P. 85° C.)

Still further illustrations are allyl diethyl dithiocarbamate (B. P. 110–111° C), phthalimido methyl diethyl dithiocarbamate (M. P. 122° C), phthalimido methyl dimethyl dithiocarbamate (M. P. 161–163° C), di-iodo methyl dimethyl dithiocarbamate (M. P. 76° C), and trimethylmethyl diethyl dithiocarbamate respectively.

Triphenylmethyl ethyl xanthogenate and 2,6 dinitro 4 chlorophenyl dithiobenzoate also accelerate vulcanization and constitute examples of xanthogenates (R=O; X=S) and dithiobenzoates (R=C; X=S).

Triphenyl methyl ethyl xanthogenate may be prepared as follows:

To 100 cc. of ethyl alcohol were added a solution of 4 grams of sodium hydroxide in 5 cubic centimeters of water and 6 cubic centimeters of carbon disulphide. The solution was kept cold during these operations.

To the above, which is an alcoholic solution of sodium ethyl xanthogenate, were added 20 grams of triphenyl chlor-methane. After refluxing for an hour the crystalline material which separated out was filtered from the alcohol. This crystalline material was separated into two parts by fractional re-crystallization. One part of about 10 grams weight proved to be triphenyl methyl ethyl ether with a melting point of 83° C., and the other part proved to be triphenylmethyl ethyl xanthogenate with a melting point of 138° C., weighing 6 grams.

Except as indicated above, all of these new compounds may be obtained in crystalline form. They are in general soluble in benzol, acetone and hot alcohol, slightly soluble in cold alcohol, and insoluble in water.

All of the above compounds are new chemicals, not recorded in the literature. The preparation of these materials forms the subject matter of separate applications.

The dithiocarbamates may be prepared in the same general manner as has been described for the 2-4 dinitrophenyl dimethyl dithiocarbamate.

All of the above mentioned compounds are accelerators of vulcanization. Some of them give high tensile strength and other valuable physical properties such as improved resistance to abrasion, ageing, and other properties. The claims are therefore to be broadly interpreted as including such treatment of rubber in any form (solid, solution, dispersion) for these purposes, as well as for vulcanization, in which the latter instance, it is understood that a vulcanizing agent and a metallic oxide or its equivalent will be added to the rubber, and an antioxidant or other material improving the physical properties of the rubber may be present if desired. It is of course understood that not all of these compounds are of equal accelerating strength, pound for pound, under identical vulcanizing conditions. These accelerators may be used in conjunction with any of the known antioxidants and other materials introduced into rubber to improve ageing and other physical properties.

Diphenylmethyl dimethyl dithiocarbamate, diphenyl methyl diethyl dithiocarbamate, diphenylmethyl benzothiazyl-sulphide, allyl diethyl dithiocarbamate, allyl benzothiazyl sulphide, accelerate, but the degree of acceleration is very small, and at present is regarded as of no commercial importance. Phthalimidomethyl diethyl dithiocarbamate accelerates vulcanization somewhat more than the diphenylmethyl compounds, and hydrolyzes somewhat more rapidly than diphenylmethyl dimethyl dithiocarbamate. Methyl dimethyl dithiocarbamate and methyl benzothiazylsulphide are examples of compounds which do not hydrolyze as rapidly as diphenylmethyl dimethyl dithiocarbamate in the herein described test, and the pure compounds did not accelerate vulcanization under the conditions given above as examples.

The accelerating compounds in general may be used in amounts varying between 1/10 and 2 parts on 100 parts of rubber, depending of course on the type of stock, etc., but these amounts are not absolute, as greater or larger amounts may be employed if desired.

It is believed that, in general, as the molecular weight of the groups attached to the nitrogen is increased the higher is the vulcanizing temperature, when equi-molecular amounts of accelerator are considered, and the more resistant are the compounds to pre-vulcanization on the mixing mills, and the better is their action with litharge in the absence or presence of zinc oxide.

The rate of reaction of the compound with sodium hydroxide in boiling aqueous alcohol may be determined as follows:

.00125 moles of the compound is weighed into a 50 cc Erlenmeyer; 25 cc 95% alcohol and .00125 moles sodium hydroxide in the form of an approximately normal solution are added and the solution brought to the boiling point as quickly as possible and kept there for exactly 30 minutes. The solution is then cooled quickly and titrated with approximately N/10 acid, using phenolphthalein as the indicator. Carbon dioxide-free water should be used throughout. A blank should be run in order to check up on the amount of acid necessary to neutralize the sodium hydroxide when no compound is used. The decrease in hydroxyl ion content during the boiling is taken as a measure of the extent of the reaction with sodium hydroxide.

The above procedure constitutes a method whereby the relative rate of hydrolysis of any given compound of the types disclosed may be compared with that of diphenylmethyl dimethyl dithiocarbamate.

The diphenylmethyl dimethyl dithiocarbamate may be prepared in accordance with the general procedure indicated herein, that is, reacting together sodium dimethyl dithiocarbamate and diphenyl chloro methane. The reactants are dissolved as indicated herein in dilute alcohol and caused to react under heat until the diphenylmethyl dimethyl dithiocarbamate separates from the mixture as an oil. This oil solidifies and crystalizes over night and may be purified by recrystallization from alcohol.

It is known that the rate of hydrolysis of organic compounds, or more exactly, their rate of reaction with a base such as sodium hydroxide, varies with the substituents in the organic compound. This variation has been utilized in the present invention.

Having thus described my invention, what I claim and desire to protect by Letters Patent is:

1. A vulcanized rubber product derived from rubber containing zinc oxide, a vulcanizing agent, and an organic ester including the group

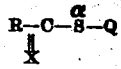

in which R represents either N, O or C, or further represents S when X is N; X represents S, or further represents N when R is S; and Q represents a substituted $\overset{\alpha}{S}$-aryl group comprising more than C and H, or a di- or tri-substituted $\overset{\alpha}{S}$-methyl group, which said ester is capable of hydrolyzing at the $\overset{\alpha}{S}$-Q bond in aqueous alcohol in the presence of sodium hydroxide at least as rapidly as diphenylmethyl dimethyl dithiocarbamate under the same conditions.

2. A vulcanized rubber product derived from rubber containing zinc oxide, sulphur and an organic ester including the group

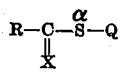

in which R represents either N, O, or C, or further represents S when X is N; X represents S, or further represents N when R is S; and Q represents a substituted $\overset{\alpha}{S}$-aryl group comprising more than C and H, or a di- or tri-substituted $\overset{\alpha}{S}$-methyl group, the substituents being such that said ester hydrolyzes at $\overset{\alpha}{S}$-Q bond in aqueous alcohol in the presence of sodium hydroxide at least as rapidly as diphenylmethyl dimethyl dithiocarbamate under the same conditions.

3. A vulcanized rubber product derived from rubber containing zinc oxide, sulphur and an organic ester including the group

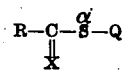

in which R represents either N, O, or C, or further represents S when X is N; X represents S, or further represents N when R is S; and Q represents a substituted $\overset{\alpha}{S}$-aryl group comprising more than C and H, or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

4. A vulcanized rubber product derived from rubber containing zinc oxide, a vulcanizing agent, and an organic ester including the group

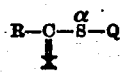

in which R represents either N, O or C, or further represents S when X is N; X represents S, or further represents N when R is X; and Q represents an $\overset{\alpha}{S}$-nitroaryl group in which at least one of the positions 2-, 4-, and 6- is occupied by a nitro group, or a di- or tri-substituted $\overset{\alpha}{\text{S}}$-methyl group, which said ester is capable of hydrolyzing at the $\overset{\alpha}{\text{S}}$-Q bond in aqueous alcohol in the presence of sodium hydroxide at least as rapidly as diphenylmethyl dimethyl dithiocarbamate under the same conditions.

5. A vulcanized rubber product derived from rubber containing zinc oxide, a vulcanizing agent, and an organic ester including the group $$R-\underset{X}{\overset{\alpha}{\text{C}}-\text{S}-Q}$$

in which R represents either N, O or C, or further represents S when X is N; X represents S, or further represents N when R is X; and Q represents an $\overset{\alpha}{\text{S}}$-nitroaryl group in which at least one of the positions 2-, 4-, and 6- is occupied by a nitro group, or an aryl-substituted $\overset{\alpha}{\text{S}}$-methyl group, which said ester is capable of hydrolyzing at the $\overset{\alpha}{\text{S}}$-Q bond in aqueous alcohol in the presence of sodium hydroxide at least as rapidly as diphenylmethyl dimethyl dithiocarbamate under the same conditions.

6. A vulcanized rubber product derived from rubber containing zinc oxide, a vulcanizing agent, and an organic ester including the group $$R-\underset{X}{\overset{\alpha}{\text{C}}-\text{S}-Q}$$

in which R represents either N, O or C, or further represents S when X is N; X represents S, or further represents N when R is S; and Q is a 2,4-dinitrophenyl group, or a di- or tri-substituted $\overset{\alpha}{\text{S}}$-methyl group, which said ester is capable of hydrolyzing at the $\overset{\alpha}{\text{S}}$-Q bond in aqueous alcohol in the presence of sodium hydroxide at least as rapidly as diphenylmethyl dimethyl dithiocarbamate under the same conditions.

7. A vulcanized rubber product derived from rubber containing zinc oxide, a vulcanizing agent, and an organic ester including the group $$R-\underset{X}{\overset{\alpha}{\text{C}}-\text{S}-Q}$$

in which R represents either N, O or C, or further represents S when X is N; X represents S, or further represents N when R is S; and Q is a 2,4-dinitrophenyl group or an aryl-substituted $\overset{\alpha}{\text{S}}$-methyl group, which said ester is capable of hydrolyzing at the $\overset{\alpha}{\text{S}}$-Q bond in aqueous alcohol in the presence of sodium hydroxide at least as rapidly as diphenylmethyl dimethyl dithiocarbamate under the same conditions.

8. A vulcanized rubber product derived from rubber containing zinc oxide, a vulcanizing agent and a compound including the group $$R-\underset{X}{\overset{\alpha}{\text{C}}-\text{S}-Q}$$

in which R represents either N, O or C, or further represents S when X is N; X represents S, or further represents N when R is S; and Q is an $\overset{\alpha}{\text{S}}$-nitroaryl group in which at least one of the positions 2-, 4-, and 6- is occupied by a nitro group.

9. A vulcanized rubber product derived from rubber containing zinc oxide, a vulcanizing agent, and a compound including the group $$R-\underset{X}{\overset{\alpha}{\text{C}}-\text{S}-Q}$$

in which R represents either N, O or C, or further represents S when X is N; X represents S, or further represents N when R is S; and Q is an $\overset{\alpha}{\text{S}}$-polynitrophenyl group in which at least two of the positions 2-, 4-, and 6- are occupied by nitro groups.

10. A vulcanized rubber product derived from rubber containing zinc oxide, a vulcanizing agent, and a compound including the group $$R-\underset{X}{\overset{\alpha}{\text{C}}-\text{S}-Q}$$

in which R represents either N, O or C, or further represents S when X is N; X represents S, or further represents N when R is X; and Q represents a 2,4-dinitrophenyl group.

11. A vulcanized rubber product derived from rubber containing zinc oxide, a vulcanizing agent, and an organic ester having the formula R'—$\overset{\alpha}{\text{S}}$—Q in which R' is a thiazyl group and Q represents a substituted $\overset{\alpha}{\text{S}}$-aryl group or a di- or tri-substituted $\overset{\alpha}{\text{S}}$-methyl group, the substituents being such that said ester hydrolyzes at the $\overset{\alpha}{\text{S}}$-Q bond in aqueous alcohol in the presence of sodium hydroxide at least as rapidly as diphenylmethyl dimethyl dithiocarbamate under the same conditions.

12. A vulcanized rubber product derived from rubber containing zinc oxide, a vulcanizing agent, and an organic ester having the formula R'—$\overset{\alpha}{\text{S}}$—Q in which R' is a thiazyl group and Q represents a substituted $\overset{\alpha}{\text{S}}$-aryl group or an aryl-substituted $\overset{\alpha}{\text{S}}$-methyl group, the substituents being such that said ester hydrolyzes at the $\overset{\alpha}{\text{S}}$-Q bond in aqueous alcohol in the presence of sodium hydroxide at least as rapidly as diphenylmethyl dimethyl dithiocarbamate under the same conditions.

13. A vulcanized rubber product derived from rubber containing zinc oxide, a vulcanizing agent, and an organic ester having the formula $R'—\overset{\alpha}{S}—Q$ in which $R'$ is a benzothiazyl group and $Q$ represents a substituted $\overset{\alpha}{S}$-aryl group or a di- or tri-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

14. A vulcanized rubber product derived from rubber containing zinc oxide, a vulcanizing agent, and an organic ester having the formula $R'—\overset{\alpha}{S}—Q$ in which $R'$ is a benzothiazyl group and $Q$ represents a substituted $\overset{\alpha}{S}$-aryl group or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

15. A process of treating rubber which comprises vulcanizing rubber containing zinc oxide and sulphur in the presence of an organic ester including the group

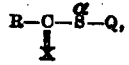

in which $R$ represents either $N$, $O$, or $C$, or further represents $S$ when $X$ is $N$; $X$ represents $S$ or further represents $N$ when $R$ is $S$, and $Q$ represents a substituted $\overset{\alpha}{S}$-aryl group comprising more than $C$ and $H$, or a di- or tri-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

16. A process of treating rubber which comprises vulcanizing rubber containing zinc oxide and sulphur in the presence of an organic ester including the group

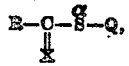

in which $R$ represents either $N$, $O$, or $C$, or further represents $S$ when $X$ is $N$; $X$ represents $S$ or further represents $N$ when $R$ is $S$, and $Q$ represents a substituted $\overset{\alpha}{S}$-aryl group comprising more than $C$ and $H$, or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

17. A process of treating rubber which comprises vulcanizing rubber containing zinc oxide and sulphur in the presence of an organic ester including the group

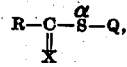

in which $R$ represents either $N$, $O$ or $C$, or further represents $S$ when $X$ is $N$; $X$ represents $S$ or further represents $N$ when $R$ is $S$, and $Q$ represents a substituted $\overset{\alpha}{S}$-aryl group comprising more than $C$ and $H$, or an $\overset{\alpha}{S}$-methyl group which is further linked to at least two substituents other than $H$, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

18. A process of treating rubber which comprises vulcanizing rubber containing zinc oxide and sulphur in the presence of an organic ester including the group

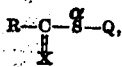

in which $R$ represents either $N$, $O$, or $C$, or further represents $S$ when $X$ is $N$; $X$ represents $S$ or further represents $N$ when $R$ is $S$, and $Q$ represents an $\overset{\alpha}{S}$-nitroaryl group in which at least one of the positions 2-, 4-, and 6- is occupied by a nitro group, or a di- or tri-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethal dimethyl dithiocarbamate under the same conditions.

19. A process of treating rubber which comprises vulcanizing rubber containing zinc oxide and sulphur in the presence of an organic ester including the group

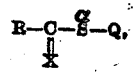

in which $R$ represents either $N$, $O$, or $C$, or further represents $S$ when $X$ is $N$; $X$ represents $S$ or further represents $N$ when $R$ is $S$, and $Q$ represents an $\overset{\alpha}{S}$-nitroaryl group in which at least one of the positions 2-, 4-, and 6- is occupied by a nitro group or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

20. A process of treating rubber which comprises vulcanizing rubber containing zinc oxide and sulphur in the presence of an organic ester including the group $$R-\underset{X}{\overset{\parallel}{C}}-\overset{\alpha}{S}-Q$$

in which R represents either N, O, or C, or further represents S when X is N; X represents S or further represents N when R is S, and Q represents an $\overset{\alpha}{S}$-polynitrophenyl group in which at least one of the positions, 2-, 4-, and 6- is occupied by a nitro group or a di- or tri-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

21. A process of treating rubber which comprises vulcanizing rubber containing zinc oxide and sulphur in the presence of an organic ester including the group $$R-\underset{X}{\overset{\parallel}{C}}-\overset{\alpha}{S}-Q,$$

in which R represents either N, O, or C, or further represents S when X is N; X represents S or further represents N when R is S, and Q represents an $\overset{\alpha}{S}$-polynitrophenyl group in which at least one of the positions 2-, 4-, and 6- is occupied by a nitro group or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

22. A process of treating rubber which comprises vulcanizing rubber containing zinc oxide and sulphur in the presence of an organic ester including the group $$R-\underset{X}{\overset{\parallel}{C}}-\overset{\alpha}{S}-Q,$$

in which R represents either N, O, or C, or further represents S when X is N; X represents S or further represents N when R is S, and Q represents a 2,4-dinitrophenyl group or a di- or tri-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

23. A process of treating rubber which comprises vulcanizing rubber containing zinc oxide and sulphur in the presence of an organic ester including the group $$R-\underset{X}{\overset{\parallel}{C}}-\overset{\alpha}{S}-Q,$$

in which R represents either N, O, or C, or further represents S when X is N; X represents S or further represents N when R is S, and Q represents a 2,4-dinitrophenyl group or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

24. A process of treating rubber which comprises vulcanizing rubber containing zinc oxide and sulphur in the presence of an organic ester including the group $$R-\underset{X}{\overset{\parallel}{C}}-\overset{\alpha}{S}-Q,$$

in which R represents either N, O, or C, or further represents S when X is N; X represents S, or further represents N when R is S; and Q represents an $\overset{\alpha}{S}$-nitroaryl group in which at least one of the positions 2-, 4-, and 6- is occupied by a nitro group.

25. A process of treating rubber which comprises vulcanizing rubber containing zinc oxide and sulphur in the presence of an organic ester including the group $$R-\underset{X}{\overset{\parallel}{C}}-\overset{\alpha}{S}-C,$$

in Which R represents either N, O, or C, or further represents S when X is N; X represents S, or further represents N when R is S; and Q represents an $\overset{\alpha}{S}$-polynithophenyl group in which at least two of the positions 2-, 4-, and 6- are occupied by nitro groups.

26. A process of treating rubber which comprises vulcanizing rubber containing zinc oxide and sulphur in the presence of an organic ester including the group $$R-\underset{X}{\overset{\parallel}{C}}-\overset{\alpha}{S}-Q,$$

in which R represents either N, O, or C, or further represents S when X is N; X represents S, or further represents N when R is S; and Q represents a 2 4-dinitrophenyl group.

27. A process of treating rubber which comprises vulcanizing rubber containing zinc oxide and sulphur in the presence of an organic ester having the formula $R'-\overset{\alpha}{S}-Q$ in which $R'$ is a thiazyl group and Q represents a substituted $\overset{\alpha}{S}$-aryl group or a di- or tri-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

28. A process of treating rubber which comprises vulcanizing rubber containing zinc oxide and sulphur in the presence of an organic ester having the formula $R'-\overset{\alpha}{S}-Q$ in which $R'$ is a thiazyl group and Q represents a substituted $\overset{\alpha}{S}$-aryl group or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

29. A process of treating rubber which comprises vulcanizing rubber containing zinc oxide and sulphur in the presence of an organic ester having the formula $R'-\overset{\alpha}{S}-Q$ in which $R'$ is a benzothiazyl group and Q represents a substituted $\overset{\alpha}{S}$-aryl group or a di- or tri-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

30. A process of treating rubber which comprises vulcanizing rubber containing zinc oxide and sulphur in the presence of an organic ester having the formula $R'-\overset{\alpha}{S}-Q$ in which $R'$ is a benzothiazyl group and Q represents a substituted $\overset{\alpha}{S}$-aryl group or an aryl-substituted $\overset{\alpha}{S}$-methyl group, the substituents being such that said ester hydrolyzes at the $\overset{\alpha}{S}$-Q bond in aqueous alcohol in the presence of sodium hydroxide at least as rapidly as diphenylmethyl dimethyl dithiocarbamate under the same conditions.

31. A process of vulcanizing rubber which comprises vulcanizing rubber in the presence of an ester of a thio acid selected from the group of acids consisting of dithiocarbamic acids, xanthogenic acids, dithiobenzoic acids, mercaptothiazoles, in which the ester group is a substituted aryl group comprising more than C and H, or a di- or tri-substituted methyl group, the substituents in said ester group including at least two radicals of strongly negative character.

32. A process of vulcanizing rubber which comprises vulcanizing rubber in the presence of an ester of a thio acid selected from the group of acids consisting of dithiobenzoic acids, mercaptothiazoles, in which the ester group is a substituted aryl group comprising more than C and H, or a di- or tri-substituted methyl group.

33. Vulcanized rubber derived from rubber containing a metallic oxide, a vulcanizing agent, and a S-nitro-phenyl mercaptothiazole.

34. Vulcanized rubber derived from rubber containing zinc oxide, sulphur, and a S-nitrophenyl mercaptothiazole.

35. Vulcanized rubber derived from rubber containing a metallic oxide, a vulcanizing agent, and a S-polynitrophenyl mercaptobenzothiazole.

36. Vulcanized rubber derived from rubber containing zinc oxide, sulphur, and a S-polynitrophenyl mercaptobenzothiazole.

37. Vulcanized rubber derived from rubber containing a metallic oxide, a vulcanizing agent, and a S-dinitrophenyl mercaptobenzothiazole.

38. Vulcanized rubber derived from rubber containing zinc oxide, sulphur, and a S-dinitrophenyl mercaptobenzothiazole.

39. A vulcanized rubber product resulting from the process as set forth in claim 43.

40. A process of treating rubber which comprises vulcanizing rubber containing zinc oxide and a vulcanizing agent in the presence of a S-nitrophenyl mercaptothiazole.

41. A process of treating rubber which comprises vulcanizing rubber containing zinc oxide and a vulcanizing agent in the presence of a S-polynitrophenyl mercaptobenzothiazole.

42. A process of treating rubber which comprises vulcanizing rubber containing zinc oxide and a vulcanizing agent in the presence of a S-dinitrophenyl mercaptobenzothiazole.

43. A process of treating rubber which comprises vulcanizing rubber containing zinc oxide and a vulcanizing agent in the presence of 2,4-dinitrophenyl benzothiazyl sulphide.

44. A process which comprises vulcanizing rubber containing sulphur and zinc oxide in the presence of a compound having the formula

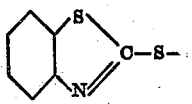

where Q is a di- or tri-substituted methyl group, the group as a whole including at least two radicals of strongly negative character.

45. A process which comprises vulcanizing rubber containing sulphur and zinc oxide in the presence of a compound having the formula

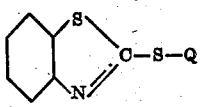

where Q is the methyl carbon atom of a di- or tri-substituted methyl group, the said methyl carbon atom being directly attached to an aryl nucleus.

46. A process which comprises vulcanizing rubber containing sulphur and zinc oxide in the presence of a compound having the formula

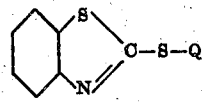

where Q is the methyl carbon atom of a di- or tri-substituted methyl group, the said methyl carbon atom being directly attached to a benzene nucleus.

47. A process which comprises vulcanizing rubber containing sulphur and zinc oxide in the presence of a compound having the formula

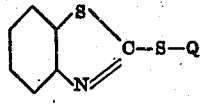

where Q consists of a benzene nucleus having at least one acidic substituent.

Signed at New York, New York, this 23rd day of February, 1928.

SIDNEY M. CADWELL.